US008510257B2

(12) United States Patent
Archambeau et al.

(10) Patent No.: US 8,510,257 B2
(45) Date of Patent: Aug. 13, 2013

(54) COLLAPSED GIBBS SAMPLER FOR SPARSE TOPIC MODELS AND DISCRETE MATRIX FACTORIZATION

(75) Inventors: Cedric P. C. J. G. Archambeau, Grenoble (FR); Guillaume M. Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 12/907,219

(22) Filed: Oct. 19, 2010

(65) Prior Publication Data

US 2012/0095952 A1 Apr. 19, 2012

(51) Int. Cl.
*G06F 9/44* (2006.01)

(52) U.S. Cl.
USPC ......................................................... 706/52

(58) Field of Classification Search
None
See application file for complete search history.

(56) References Cited

U.S. PATENT DOCUMENTS

| 5,598,557 | A   | * | 1/1997  | Doner et al. ........................... 1/1 |
| 2007/0118498 | A1 | * | 5/2007  | Song et al. ........................... 707/1 |
| 2008/0249999 | A1 | * | 10/2008 | Renders et al. ...................... 707/4 |
| 2009/0271433 | A1 | * | 10/2009 | Perronnin et al. ............... 707/103 R |
| 2010/0280985 | A1 | * | 11/2010 | Duchon et al. ................... 706/52 |
| 2011/0243450 | A1 | * | 10/2011 | Liu ................................. 382/190 |
| 2011/0258229 | A1 | * | 10/2011 | Ni et al. ........................ 707/776 |

OTHER PUBLICATIONS

Williamson et al., "The ibp-compound dirichlet process and its application to focused topic modelling," In 27th International Conference on Machine Learning (ICML), ACM, Jun. 2010.

Williamson et al., "Focused Topic Models," NIPS Workshop on Applications for Topic Models: Text and Beyond, Whistler, Canada, Dec. 2009.
Wang et al., "Decoupling Sparsity and Smoothness in the Discrete Hierarchical Dirichlet Process," In Advances in Neural Information Processing Systems 23 (NIPS) MIT Press, 2009.
Minka, "Estimating a Dirichlet Distribution," Technical Report, Microsoft Research, Cambridge, 2000 (revised 2003).
Hofmann, "Probabilistic Latent Semantic Analysis," UAI, Morgan Kaufmann, 1999.
Griffiths et al., "Prediction and Semantic Association," NIPS, MIT Press, 2002.
Griffiths et al., "Infinite Latent Feature Models and the Indian Buffet Process," NIPS 17, MIT Press, 2005.
Friedman et al., "Efficient Bayes an Parameter Estimation in Large Discrete Domains," NIPS 11, MIT Press, 1999.
Blei et al., "Latent Dirichlet Allocation," Journal of Machine Learning Research, 3:993-1022, 2003.

\* cited by examiner

*Primary Examiner* — Jeffrey A Gaffin
*Assistant Examiner* — Paulinho E Smith
(74) *Attorney, Agent, or Firm* — Fay Sharpe LLP

(57) ABSTRACT

In an inference system for organizing a corpus of objects, feature representations are generated comprising distributions over a set of features corresponding to the objects. A topic model defining a set of topics is inferred by performing latent Dirichlet allocation (LDA) with an Indian Buffet Process (IBP) compound Dirichlet prior probability distribution. The inference is performed using a collapsed Gibbs sampling algorithm by iteratively sampling (1) topic allocation variables of the LDA and (2) binary activation variables of the IBP compound Dirichlet prior. In some embodiments the inference is configured such that each inferred topic model is a clean topic model with topics defined as distributions over sub-sets of the set of features selected by the prior. In some embodiments the inference is configured such that the inferred topic model associates a focused sub-set of the set of topics to each object of the training corpus.

21 Claims, 5 Drawing Sheets

COLLAPSED GIBBS SAMPLER FOR SPARSE TOPIC MODELS AND DISCRETE MATRIX FACTORIZATION

BACKGROUND

The following relates to the document or object processing arts, clustering arts, classification arts, retrieval arts, and so forth.

In document (or more generally, object, a general term intended to encompass text documents, images, audio/video content, or so forth) processing, it is useful to generate a statistical topic model defining a set of topics. For text documents represented using "bag-of-words" representations, a topic of the topic model is suitably represented as a statistical distribution over words that are typical of the topic. A new document can be associated with topics with varying association strengths based on similarities between the topics and the distribution of words in the document. As another application, given an input document selected from a corpus of documents already modeled using the topic models, similar documents can be rapidly identified by comparison of the topic association strengths.

The word distributions of a text document can be considered features of the text document, and the topics of the topic model are statistical distributions of these features that are typical of the topics. For other types of objects, features of the objects are derived and topics of the topic model are generated as statistical distributions of features that are typical of the topic. As an example, an image can be characterized by visual features extracted from spatial regions, or "patches", of the image.

Various approaches can be employed for generating the topic model. Non-negative matrix factorization techniques such as Latent Dirichlet Allocation (LDA) or probabilistic latent semantic analysis (PLSA) are known approaches, and have been used in applications such as text clustering, dimensionality reduction of large sparse arrays, or so forth. Underlying the LDA and PLSA models is the observation that a large matrix containing positive values can be approximated by a sum of rank-one positive matrices. Compared to more classical matrix factorization techniques such as Singular Value Decomposition that are rotationally invariant, the low-rank matrices obtained by non-negative decompositions are often nearly sparse, i.e. they contain few large positive values and many small values close to zero. The large values correspond in general to clusters of rows and columns of the original matrices, and are identifiable with topics. These topic models can be formalized as generative models for large sparse positive matrices, e.g. large sets of documents. Topic models are typically used to organize these documents according to themes (that is, topics) in an unsupervised way, that is, without reliance upon document topic annotations or other a priori information about the topics. In this framework, topics are defined as discrete distributions over vocabulary words (for text documents; more generally, distributions over features of objects) and topics are associated to each document according to a relative weighting (proportions).

The following sets forth improved methods and apparatuses.

BRIEF DESCRIPTION

In some illustrative embodiments disclosed as illustrative examples herein, a storage medium is disclosed storing instructions executable by a processor to perform a method comprising: generating feature representations comprising distributions over a set of features corresponding to objects of a training corpus of objects; and inferring a topic model defining a set of topics by performing latent Dirichlet allocation (LDA) with an Indian Buffet Process (IBP) compound Dirichlet prior probability distribution (that is, LIDA), the inferring being performed using a collapsed Gibbs sampling algorithm by iteratively sampling (1) topic allocation variables of the LDA and (2) binary activation variables of the IBP compound Dirichlet prior probability distribution.

In some embodiments as set forth in the immediately preceding paragraph, the LIDA is performed with an IBP compound Dirichlet prior configured such that the inferred topic model is a clean topic model in which each topic is defined as a distribution over a sub-set of the set of features selected by the IBP compound Dirichlet prior probability distribution. In some embodiments as set forth in the immediately preceding paragraph, the LDA is performed with an IBP compound Dirichlet prior configured such that the inferred topic model associates a focused sub-set of the set of topics to each object of the training corpus.

In some illustrative embodiments disclosed as illustrative examples herein, a method comprises: generating feature representations comprising distributions over a set of features corresponding to objects of a training corpus of objects; and inferring a generative topic model defining a set of topics by performing a latent generative topic model allocation using a collapsed Gibbs sampling algorithm with an Indian Buffet Process (IBP) compound prior probability distribution; wherein the inferring includes iterative sampling of (1) topic allocation variables of the generative topic model allocation and (2) binary activation variables of the IBP compound prior probability distribution; and wherein the generating and inferring are performed by a digital processor.

In some illustrative embodiments disclosed as illustrative examples herein, a processor is disclosed, which is configured to perform a method as set forth in the immediately preceding paragraph.

DETAILED DESCRIPTION

Figure 1:
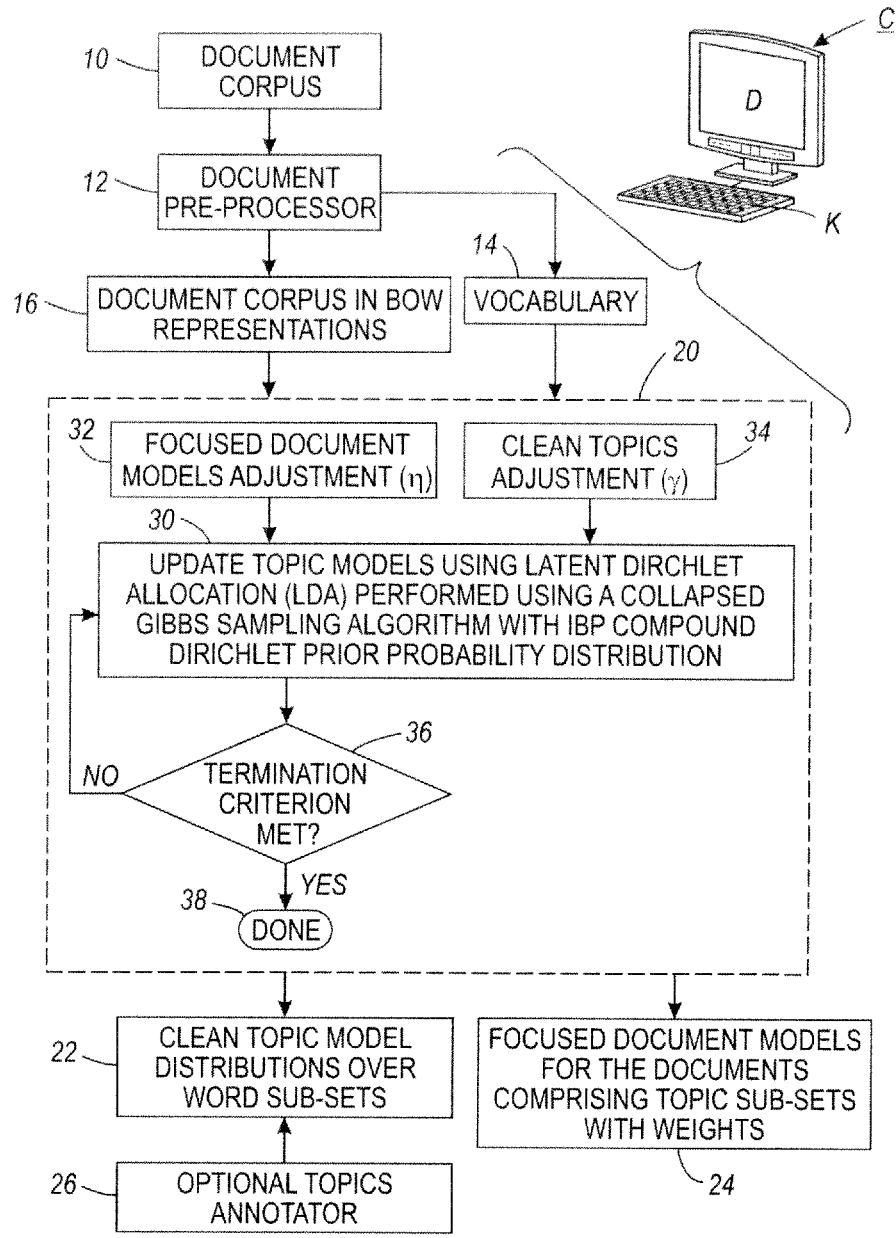
FIG. 1 diagrammatically shows an inference system for generating a topic model defining a set of topics for organizing a corpus of documents.

It is recognized herein that the degree of sparsity of the decomposition is a parameter of interest in nonnegative matrix factorization applications. For example, in the context of document clustering, clusters correspond to themes or topics, which in turn are implicitly defined by discrete distribution over a set of vocabulary words used in bag-of-words document representations (or more generally, over a set of features used in feature representations of objects). Hence, topics can be interpreted by considering the non-zero entries, that is the set of words to which positive weight is associated.

However, it is recognized herein that topics obtained by latent generative topic model allocation techniques such as PLSA or LDA are, in many practical applications, not sufficiently sparse. Stated another way, the topics are not "clean" because they contain low (but still finite) values for infrequent words (or, more generally, features). The overall collection of topics is also sometimes not focused, meaning that all topics are assigned positive weight in each document and infrequently occurring topics contribute less to the organization of documents based on the set of topics—yet, the occurrence of an infrequently occurring topic for a specific document may be highly informative for that specific document.

Disclosed herein are approaches that overcome these difficulties by a latent generative topic model allocation that is tunable to yield clean topics comprising a distribution over a sub-set of the set of vocabulary words (or, more generally, over a sub-set of the set of features). The latent generative topic model allocation is also independently (and optionally concurrently) tunable such that the inferred topic model produces document models that associate a focused sub-set of the set of topics to each document (or, more generally, object) of a training corpus. The approaches employ latent generative topic model allocation using a collapsed Gibbs sampling algorithm with an Indian Buffet Process (IBP) compound prior probability distribution. The prior has a tunable parameter for tuning the "cleanness" of the clean topics by suitably adjusting the sparsity of the prior, and hence the sparsity of the generated clean topics. The prior also has an independent tunable parameter for tuning "how focused" is the focused sub-set of the set of topics (i.e., the document model) associated to each document (or object), again by suitably adjusting the sparsity of the prior and hence the sparsity of the focused topic allocations.

The foregoing is disclosed herein with reference to an illustrative embodiment in which the objects undergoing processing comprise documents including text, the feature representations comprise bag-of-words representations, and the set of features comprises a set of vocabulary words. More generally, however, the objects may be any type of object (e.g., text documents, images, multimodal documents, audio-video content units, or so forth) in which each object is characterized by values for a set of features (i.e., a feature representation).

In the illustrative embodiment latent Dirichlet allocation (LDA) is used as the latent generative topic model, and the LDA is implemented using a collapsed (also known as Rao-Blackwellised) Gibbs sampling algorithm with a Indian Buffet Process (IBP) compound Dirichlet prior probability distribution. More generally, however, other latent generative topic model allocation approaches, such as probabilistic latent semantic analysis (PLSA) allocation, can be employed in conjunction with a suitable IBP compound prior probability distribution. Implementing the latent generative topic model allocation using a Gibbs sampling algorithm with a compound prior probability distribution is convenient; however, other implementations of the latent generative topic model allocation are also contemplated. The latent generative topic model allocation infers a generative topic model defining a set of topics. Each generative topic model comprises a distribution over the set of vocabulary words (or, more generally, the set of features used in the feature representations of the objects). In embodiments in which the cleanness tuning parameter is used, the topics of the inferred topic model are clean topics each comprising a distribution over a sub-set of the set of vocabulary words. In embodiments in which the focussedness tuning parameter is used, the inferred topic model is focused such that documents are represented by sub-sets of the set of topics.

With reference to FIG. 1, an inference system is described for generating a topic model defining a set of topics for organizing a training corpus 10 of documents. The documents of training corpus 10 are processed by a document pre-processor 12 that identifies a vocabulary 14 (that is, a set of vocabulary words used in the documents of the corpus 10) and generates a bag-of-words representation 16 for each document of the training corpus 10. The vocabulary 14 suitably includes a sub-set of the words used in the corpus 10, with the vocabulary words selected based on criteria such as word length (e.g., words of less than three letters, or four letters, or so forth, may be discarded), frequency of occurrence in the corpus 10 (e.g., any word occurring less than N times may be discarded), or so forth. Although in the system of FIG. 1 the vocabulary 14 is generated from the corpus 10, it is also contemplated for the vocabulary to be an external input to the inference system. Each bag-of-words (BOW) representation 16 comprises a vector or other structure having an element for each vocabulary word containing the word count for that vocabulary word in the document. Optionally, the word counts may be normalized by the total number of words in the document or otherwise adjusted. If a vocabulary word does not occur anywhere in the document, then the word count for that vocabulary word is typically zero.

A modeling module 20 processes the training corpus of BOW representations 16 to generate a topic model. The illustrative modeling module 20 employs latent IBP compound Dirichlet allocation (LIDA) as disclosed herein. Unlike conventional LDA which is performed with a conventional Dirichlet prior probability distribution, the LDA of the modeling module 20 is performed with Indian Buffet Process (IBP) compound Dirichlet prior probability distribution. (Note that the term "prior probability distribution" is sometimes shortened to "prior" herein, in accordance with conventional notation used in the art). The technique disclosed herein of performing LDA with an IBP compound Dirichlet prior is sometimes referred to herein as latent IBP Dirichlet allocation (LIDA). In the illustrative example of FIG. 1, the LIDA process is suitably implemented using a collapsed Gibbs algorithm.

The modeling module 20 outputs a topic model 22 (which is optionally clean with each topic comprising a distribution over a sub-set of the set of vocabulary words 14). The vocabulary word sub-sets of the clean topics of the clean topic model are selected by the IBP compound Dirichlet prior probability distribution, with the degree of "cleanness" or sparsity of the clean topics being controlled by a tuning parameter of the LIDA. The topic model 22 defines a set of topics, in that each topic corresponds to a semantic representation by the distribution over the set of vocabulary words 14 (or over the sub-set of vocabulary words in the case of clean topics).

The modeling module 20 also outputs document models 24 for the documents of the training corpus 10. The document models 24 represent the strength of association of the document with each topic defined by the topic model 22. In some embodiments the document models 24 are focused document models in which the inferred topic model 22 associates a focused sub-set of the set of topics to each document of the training corpus 10. In other words, in the case of a focused document model for a document there are some topics of the set of topics having zero association with the document. As with the cleanness of the topics of the clean topic model, the focusing of the focused document models 24 is selected by the IBP compound Dirichlet prior probability distribution, with the degree of focus or sparsity of the document models being controlled by a tuning parameter of the LIDA.

It is to be understood that the tuning parameter for tuning the cleanness or sparsity of the clean topics is different from and independent of the tuning parameter for tuning the focus or sparsity of the focused document models. The tuning parameter for tuning the cleanness or sparsity of the clean topics is denoted herein as $\gamma$ (that is, the lowercase Greek letter "gamma"). The tuning parameter for tuning the focus or sparsity of the focused document models is denoted herein as (that is, the lowercase Greek letter "eta").

With continuing reference to FIG. 1, the illustrative inference system for generating the topic model 22 for organizing a training corpus 10 of documents is suitably implemented by a digital processor or digital processing device such as an illustrative computer C, a network server, a central processing unit (CPU), a graphical processing unit (GPU), or so forth. In some embodiments the digital processing device include a display D for displaying an output such as the set of topics of the topic model 22 or the document models 24 or so forth. In some embodiments the digital processing device includes one or more user input devices, such as an illustrative keyboard K, a mouse, trackball, trackpad, or so forth for receiving input from a human user.

It will also be appreciated that the disclosed inference methods for generating the topic model 22 for organizing a training corpus 10 of documents can be embodied as a storage medium storing instructions executable by the computer C or another digital processor or digital processing device to perform the disclosed inference methods. The storage medium may, by way of illustrative example, comprise a hard disk or other magnetic storage medium, an optical disk or other optical storage medium, random access memory (RAM), read-only memory (ROM), flash memory, or another electronic storage medium, various combinations thereof, or so forth.

In the illustrative example of FIG. 1, for example, an optional topics annotator 26 displays representations of the topics of the topic model 22 (for example, each topic being represented by displaying documents of the corpus 10 having strong associations with the corresponding topic, or each topic being represented by displaying the top-N vocabulary words in the distribution representing the topic, or so forth). The optional topics annotator 26 then enables a human user to input topic annotations for the topics using the keyboard K or another user input device. Thus, the human user may choose to add a readily understood descriptive label for each topic.

In the following, an illustrative embodiment of the modeling module 20 is described, which operates on objects comprising documents including text, and employs LDA implemented using a collapsed Gibbs sampler with an Indian Buffet Process (IBP) compound Dirichlet prior probability distribution.

Consider a corpus of D documents. LDA models these documents as a mixture of K discrete distributions, called topics, over vocabulary words, called tokens. The model employs a bag-of-words as the feature representation.

Formally, let $w_{id} \in \{1, \ldots, V\}$ denote the token corresponding to the $i^{th}$ word observed in document d and let $z_{id} \in \{1, \ldots, K\}$ be the topic associated to this word. The generative model of LDA is defined as follows:

$$z_{id}|\bar{\theta}_d \sim \text{Discrete}(\theta_d), \theta_d \sim \text{Dirichlet}(\alpha 1_K),$$

$$w_{id}|z_{id},\{\phi_k\} \sim \text{Discrete}(\phi_{z_{id}}), \bar{\phi}_k \sim \text{Dirichlet}(\beta 1_V), \quad (1),$$

where $d=\{1,\ldots,D\}, k=\{1,\ldots,K\}$ and $i=\{1,\ldots,N_d\}$. It is assumed for this illustrative example that the number of words in document d, denoted $N_d$, is generated from a Poisson distribution.

Figure 2:
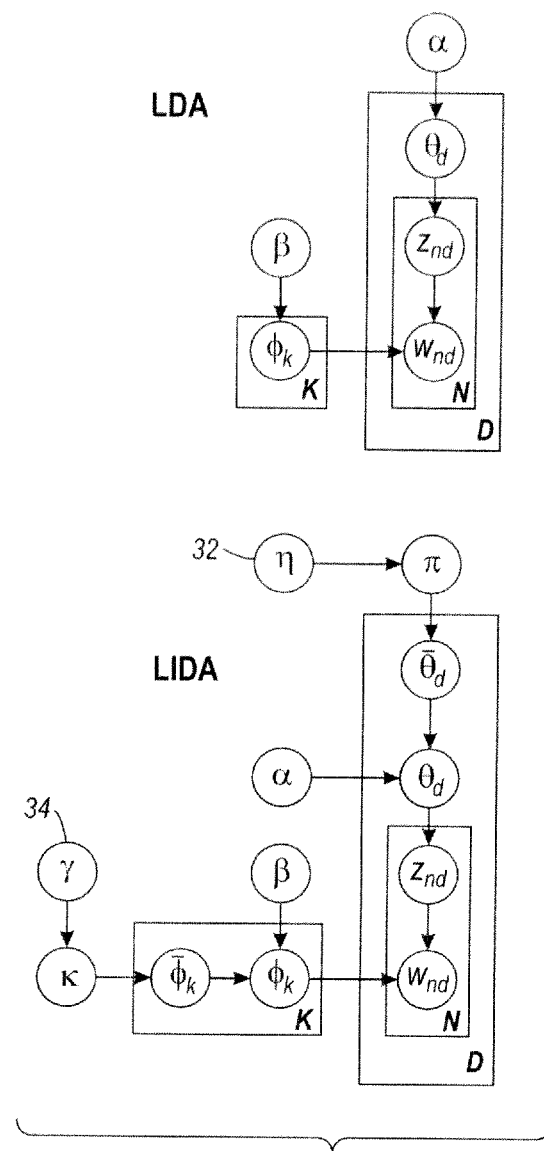
FIG. 2 diagrammatically shows: a top graph depicting a graphical model for latent Dirichlet allocation (LDA) with a conventional Dirichlet prior probability distribution; and a bottom graph depicting a graphical model for latent IBP Dirichlet allocation (LIDA) with an Indian Buffet Process (IBP) compound Dirichlet prior probability distribution.

With brief reference to FIG. 2, top graph, the graphical model of LDA is shown. It can be shown that learning the LDA model leads to the probabilistic non-negative matrix factorization $V \approx \Phi\Theta$, where each column of $V \in \mathbb{N}^{V \times D}$ is the vector of token counts per document, $\Phi=(\phi_1, \ldots, \phi_K)$ are the K discrete distributions defining the topics (and, thus, the topic model distributions 22 define K topics), and $\Theta=(\theta_1, \ldots, \theta_D)$ are the document specific topic proportions. Typically, the number of documents D is substantially larger than the number of topics K—that is, K<<D.

The generative process for LDA using a conventional Dirichlet prior can be described as follows. For each document, draw a set of topic proportions according to a (symmetric) Dirichlet distribution. For each word in the document: select a topic by drawing it from a discrete distribution with parameter equal to the set of document specific topic proportions; and select a word from the vocabulary by drawing from the discrete distribution defining the selected topic. The parameters of this discrete distribution is also drawn from a (symmetric) Dirichlet distribution. The following will be noted for LDA using a conventional Dirichlet: (i) topics are defined by distributions over all vocabulary words; and (ii) non-zero proportions are associated to all topics in each document. Condition (i) corresponds to the topics not being sparse, while condition (ii) corresponds to the document models not being sparse.

The LDA with an Indian Buffet Process (IBP) compound Dirichlet prior probability distribution is next described. This approach can be used to alleviate the topic non-sparsity issue (i), the document model non-sparsity issue (ii), or both non-sparsity issues at the same time. Toward this end, disclosed herein is a family of sparse topic models able to learn (i) clean topics, that is, topics defined by discrete distributions over a subset of vocabulary words, and (ii) associate a focused set of topics to each document, that is, only a subset of topics have non-zero proportions for a given document. Both features can be combined. All parameters are suitably estimated from the training corpus 10.

Prior to describing the collapsed Gibbs sampler algorithm, the IBP compound Dirichlet distribution and the degenerate Dirichlet distribution are introduced. Next, the latent IBP compound Dirichlet allocation (LIDA) model is described. This model is a hierarchical extension of LDA. All parameters are suitably estimated from the data.

The illustrative IBP compound Dirichlet prior is described as follows. Let $\bar{\theta} \in \mathbb{N}^{K \times D}$ be a binary matrix. It is assumed in this illustrative example that $\bar{\theta}$ serves as a prior for $\Theta$ such that they share the same sparsity pattern, but the rows of $\Theta$ sum up to one. The prior for $\Theta$ can be formalised as follows:

$$\pi_k \sim \text{Beta}\left(\frac{\eta}{K}, 1\right), \bar{\theta}_{kd} \sim \text{Bernoulli}(\pi_k), \theta_d | \bar{\theta}_d \sim \text{Dirichlet}(\alpha \bar{\theta}_d), \quad (2)$$

where the Dirichlet distribution is degenerate; it is defined over the simplex of dimension $\Sigma_k \bar{\theta}_{kd} - 1$ and is suitably interpreted as:

$$\theta_d \mid \bar{\theta}_d \sim Dirichlet(\alpha \bar{\theta}_d) = \frac{\Gamma(\bar{\theta}_{.d}\alpha)}{\prod_k \Gamma(\bar{\theta}_{kd}\alpha)^{\bar{\theta}_{kd}}} \prod_k \theta_{kd}^{(\alpha-1)\bar{\theta}_{kd}}, \quad (3)$$

where $\Gamma(\bullet)$ is the gamma function. By convention it is assumed that $\theta_{kd}=0$ if it does not belong to the support (that is, if $\bar{\theta}_{kd}=0$). The Indian Buffett Process (IBP) is obtained by integrating out $\pi=(\pi_1,\ldots,\pi_K)$ and letting $K\to\infty$ so as to yield:

$$\bar{\Theta} \sim IBP(\eta), \Theta \mid \bar{\Theta} \sim \prod_d Dirichlet(\alpha \bar{\theta}_d). \quad (4)$$

It is assumed that $\alpha$ is shared by all rows; its value is made relatively small such that the individual Dirichlet priors will be peaked. The IBP compound Dirichlet prior probability distribution is given by:

$$p(\Theta \mid \alpha, \eta) = \sum_{\bar{\Theta}} p(\Theta \mid \bar{\Theta}, \alpha) P(\bar{\Theta} \mid \eta). \quad (5)$$

From Equation (5) it is seen that the IBP compound Dirichlet prior is a mixture of degenerate Dirichlet distributions over simplices of different dimensions. Used as a prior, the compound distribution can be viewed as an instantiation of the spike and slab, which from a Bayesian perspective is the ideal sparsity-inducing prior. For $\eta\to\infty$ the non-degenerate Dirichlet distribution is recovered.

The latent IBP compound Dirichlet allocation (LIDA) model is next described. Implementing LIDA entails factorization of $V \approx \Phi\Theta$, where $\Phi \in \mathbb{R}^{V \times K}$ and $\Theta \in \mathbb{R}^{K \times D}$ with $K \ll D$. A (truncated) IBP compound Dirichlet prior probability distribution is imposed on both matrices, yielding:

$$\pi_k \sim Beta\left(\frac{\eta}{K} \cdot 1\right), \bar{\theta}_{kd} \sim Bernoulli(\pi_k), \theta_d \mid \bar{\theta}_d \sim Dirichlet(\alpha \bar{\theta}_d), \quad (6)$$

and $$\kappa_v \sim Beta\left(\frac{\gamma}{V} \cdot 1\right), \bar{\phi}_{vk} \sim Bernoulli(\kappa_v), \phi_k \mid \bar{\phi}_k \sim Dirichlet(\beta \bar{\phi}_k). \quad (7)$$

The remainder of the generative model is suitably defined as:

$$z_{id} \mid \theta_d \sim Discrete(\theta_d), w_{id} \mid z_{id}, \{\phi_k\} \sim Discrete(\phi_{z_{id}}) \quad (8).$$

To see that a sparse probabilistic matrix is obtained, the topic indicator variables $\{z_{id}\}$ are integrated out, leading to:

$$w_{id} \mid \theta_d, \{\phi_k\} \sim \sum_k \theta_{kd} Discrete(\phi_k) = Discrete(\Phi\theta_d)$$

If we assume the columns of V, denoted by $\{v_d\}$, are iid, it follows that $v_d \mid \theta_d, \Phi \sim Multinomial(\Phi\theta_d, N_d)$, where $N_d$ is the number of words in document d. From this expression it is evident that the model corresponds to a sparse non-negative matrix factorization as many of the entries of $\{\theta_d\}$ and $\{\phi_k\}$ are zero and the remaining entries are normalized to form discrete probability distributions.

The intuition behind the foregoing generative model is appealing. For every document a pool of topics is selected from the topics appearing in other documents and a small number (e.g., couple) of new topics. When generating words, first a topic is selected among the selected pool and then a word is drawn from the set of vocabulary words previously associated to this topic or from a couple of new candidate words to be associated to this topic.

Integrating out $\pi=(\pi_1,\ldots,\pi_K)$, $\kappa=(\kappa_1,\ldots,\kappa_V)$, $\{\theta_d\}$, and $\{\phi_k\}$ leads to the following marginals:

$$P(\bar{\Theta}) = \prod_k \frac{\frac{\eta}{K}\Gamma\left(\bar{\theta}_{k\cdot} + \frac{\eta}{K}\right)\Gamma(D - \bar{\theta}_{k\cdot} + 1)}{\Gamma\left(D + 1 + \frac{\eta}{K}\right)},$$

$$P(\bar{\Phi}) + \prod_v \frac{\frac{\gamma}{V}\Gamma\left(\bar{\phi}_{v\cdot} + \frac{\gamma}{V}\right)\Gamma(K - \bar{\phi}_{v\cdot} + 1)}{\Gamma\left(K + 1 + \frac{\gamma}{V}\right)},$$

$$P(z \mid \bar{\Theta}) = \prod_d \frac{\Gamma(\bar{\theta}_{\cdot d}\alpha)}{\Gamma(\bar{\theta}_{\cdot d}\alpha + n_{\cdot\cdot d})} \prod_k \left(\frac{\Gamma(\bar{\theta}_{kd}\alpha + n_{\cdot kd})}{\Gamma(\bar{\theta}_{kd}\alpha)}\right)^{\bar{\theta}_{kd}},$$

$$P(w \mid z, \bar{\Phi}) = \prod_k \frac{\Gamma(\bar{\phi}_{\cdot k}\beta)}{\Gamma(\bar{\phi}_{\cdot k}\beta + n_{\cdot k\cdot})} \prod_v \left(\frac{\Gamma(\bar{\phi}_{vk}\beta + n_{vk\cdot})}{\Gamma(\bar{\phi}_{vk}\beta)}\right)^{\bar{\phi}_{vk}},$$

where $n_{vkd}$ is the number of times v was assigned to topic k in document d. The notation $\bullet$ means that the sum is taken over the corresponding index. Note that $n_{\cdot kd}=0$ and $n_{vk\cdot}=0$ when respectively $\bar{\theta}_{kd}=0$ (as $\theta_{kd}=0$) and $\bar{\phi}_{vk}=0$(as $\phi_{vk}=0$). In the foregoing, the convention $0^0=0$ is employed.

With reference to FIG. 1 and further reference to FIG. 2, bottom graph (depicting a graphical model for LIDA), suitable LIDA processing employing a collapsed Gibbs sampling algorithm is described. A processing block 30 implements the collapsed Gibbs sampling and parameters update. The collapsed Gibbs sampler is derived from these expressions (using Bayes' rule and exchangeability):

$$P(\bar{\theta}_{kd} \mid z, \bar{\Theta}^{\backslash kd}) \propto \begin{cases} B(\bar{\theta}_{\cdot d}^{\backslash kd}\alpha + n_{\cdot\cdot d}, \alpha)\left(\bar{\theta}_{k\cdot}^{\backslash kd} + \frac{\eta}{K}\right) & \text{for } \bar{\theta}_{kd} = 1, \\ B(\bar{\theta}_{\cdot d}^{\backslash kd}\alpha, \alpha)(D - \bar{\theta}_{k\cdot}^{\backslash kd})\mathbb{1}\{n_{\cdot kd}=0\} & \text{for } \bar{\theta}_{kd} = 0., \end{cases} \quad (9)$$

$$P(\bar{\phi}_{vk} \mid w, \bar{\Phi}^{\backslash vk}, z) \propto \begin{cases} B(\bar{\phi}_{\cdot k}^{\backslash vk}\beta + n_{\cdot k\cdot}, \beta)\left(\bar{\phi}_{v\cdot}^{\backslash vk} + \frac{\gamma}{V}\right) & \text{for } \bar{\phi}_{vk} = 1, \\ B(\bar{\phi}_{\cdot k}^{\backslash vk}\beta, \beta)(K - \bar{\phi}_{v\cdot}^{\backslash vk})\mathbb{1}\{n_{vk\cdot}=0\} & \text{for } \bar{\phi}_{vk} = 0., \end{cases} \quad (10)$$

and $$P(z_{id} = k \mid w, z^{\backslash id}, \bar{\Phi}, \bar{\Theta}) \propto \frac{(\alpha + n_{\cdot kd}^{\backslash id})(\beta + n_{vk\cdot}^{\backslash id})}{\phi_{\cdot k}\beta + n_{\cdot k\cdot}^{\backslash id}} \mathbb{1}\{\bar{\theta}_{kd} = 1 \cap \bar{\phi}_{vk} = 1\}, \quad (11)$$

where $\propto$ indicates "proportional to", $\beta(\bullet,\bullet)$ is the beta function and $\mathbb{1}\{\bullet\}$ is the indicator function. The variables $\bar{\theta}_{kd}$ and $\bar{\phi}_{vk}$ are suitably sampled when $n_{\cdot kd}=0$ and $n_{vk\cdot}=0$, respectively. The algorithm can be summarized as a two-step procedure: 1) sampling topic allocation variables; and 2) sampling topic/feature binary activation variables (recall that $\bar{\Theta} \in \mathbb{N}^{K \times D}$ is a binary matrix). Additional variables such as $\phi$ and $\pi$ are not sampled as these are integrated out in the collapsed Gibbs sampling algorithm, thus increasing computational efficiency and speed of the inference.

The processing block 30 is tuned respective to the focus or sparsity of the focused document models using a tuning parameter $\eta$ (that is, the lowercase Greek letter "eta") 32. The processing block 30 is tuned respective to the cleanness or sparsity of the topics using a tuning parameter $\gamma$ (that is, the lowercase Greek letter "gamma") 34. FIG. 2 also depicts these parameters 32, 34 in the context of the graphical LIDA model. These parameters gamma 34 and eta 32 can be used to control the cleanness or focus, respectively, and can also be used to turn cleanness and/or focus on or off as described next.

When eta 32 approaches infinity (i.e., $\eta \to \infty$), sampling of $\{\bar{\theta}_{kd}\}$ is effectively turned off, as they are all equal to one. Thus, there is no reduction in the sparseness of topics in the document models. However, the parameter gamma 34 controlling the cleanness or sparsity of the topics remains finite. This produces a "clean topics model" in which each topic model comprises a distribution over a sub-set of the set of vocabulary words 14 selected by the IBP compound Dirichlet prior probability distribution, and the collapsed sampler of topics is given by:

$$P(z_{id} = k \mid z^{\setminus id}, w, \Phi) = \qquad (12)$$

$$\frac{P(w, z \mid \Phi)}{P(w, z^{\setminus id} \mid \Phi)} \propto \frac{(\alpha + n_{kd}^{\setminus id})(\bar{\phi}_{vk}\beta + n_{vk}^{\setminus id})}{\bar{\phi}_{\cdot k}\beta + n_{\cdot k}^{\setminus id}} \mathbb{1}\{\bar{\phi}_{vk} = 1\}.$$

On the other hand, when gamma 34 approaches infinity (i.e., $\gamma \to \infty$), sampling of $\{\bar{\theta}_{vk}\}$ is effectively turned off, as they are all equal to one. Thus, there is no reduction in the sparseness of the topics. However, the parameter eta 32 controlling the cleanness or sparsity of the document models remains finite. This produces a "focused document model" in which the inferred topic model associates a focused sub-set of the set of topics to each document of the training corpus 10, and the collapsed sampler of topics is given by:

$$P(z_{id} = k \mid z^{\setminus id}, w, \Theta) = \qquad (13)$$

$$\frac{P(w, z \mid \Theta)}{P(w, z^{\setminus id} \mid \Theta)} \propto \frac{(\bar{\theta}_{kd}\alpha + n_{kd}^{\setminus id})(\beta + n_{vk}^{\setminus id})}{V\beta + n_{\cdot k}^{\setminus id}} \mathbb{1}\{\bar{\theta}_{kd} = 1\}.$$

If both eta 32 and gamma 34 are finite, then Equation (11) applies and the resulting modeling implements both the clean topics and focused document model aspects. Finally, for completeness, if both $\gamma \to \infty$ and $\eta \to \infty$ then the collapsed Gibbs sampler for standard LDA is recovered.

The processing block 30 performs the collapsed Gibbs sampling of Equations (9)-(11), or of Equations (9), (10), and (12) in the case of a clean topics-only model, or of Equations (9), (10), and (13) in the case of the focused topics-only model. Additionally, the processing block 30 updates the parameters. Type 2 maximum likelihood (ML) estimation of the parameters $\alpha$ and $\beta$ can be computed by imposing Gamma priors on $\alpha$ and $\beta$ and using Minka's fixt point iteration (see T. Minka, "Estimating a Dirichlet Distribution", Technical Report, Microsoft Research, Cambridge, 2000). This leads to:

$$\alpha \leftarrow \frac{a_\alpha - 1 + \alpha \sum_d \sum_k \bar{\theta}_{kd}(\psi(\bar{\theta}_{kd}\alpha + n_{\cdot kd}) - \psi(\bar{\theta}_{kd}\alpha))}{b_\alpha + \sum_d \bar{\theta}_{\cdot d}(\psi(\bar{\theta}_{\cdot d}\alpha + n_{\cdot \cdot d}) - \psi(\bar{\theta}_{\cdot d}\alpha))}, \qquad (14)$$

and $$\beta \leftarrow \frac{a_\beta - 1 + \beta \sum_k \sum_v \bar{\phi}_{vk}(\psi(\bar{\phi}_{vk}\beta + n_{vk\cdot}) - \psi(\bar{\phi}_{vk}\beta))}{b_\beta + \sum_k \bar{\phi}_{\cdot k}(\psi(\bar{\phi}_{\cdot k}\beta + n_{\cdot k\cdot}) - \psi(\bar{\phi}_{\cdot k}\beta))}. \qquad (15)$$

Similarly, Gamma priors may be imposed on the parameters eta 32 and gamma 34 in the case of the truncated IBP, leading to the following updates:

$$\eta \leftarrow \frac{a_\eta + 1 + K}{b_\eta + \psi\left(D + 1 + \frac{\eta}{K}\right) - \frac{1}{K}\sum_k \psi\left(\bar{\theta}_{k\cdot} + \frac{\eta}{K}\right)} \qquad (16)$$

and $$\gamma \leftarrow \frac{a_\gamma - 1 + V}{b_\gamma + \psi\left(K + 1 + \frac{\gamma}{V}\right) - \frac{1}{V}\sum_v \psi\left(\bar{\phi}_{v\cdot} + \frac{\gamma}{V}\right)}. \qquad (17)$$

With continuing reference to FIG. 1, after each iteration of the collapsed Gibbs sampling and parameters update processing block 30, a decision block 36 is executed to determine whether a termination criterion is met. If not, then process flows back to the processing block 30 to perform another iteration. If the termination criterion is met, then processing terminates at a block 38. The termination criterion can comprise any suitable criterion or set of criteria, such as a percent change between iterations being below a threshold, a combination of a percent change-based criterion and a maximum iterations criterion, or so forth.

Figure 3:
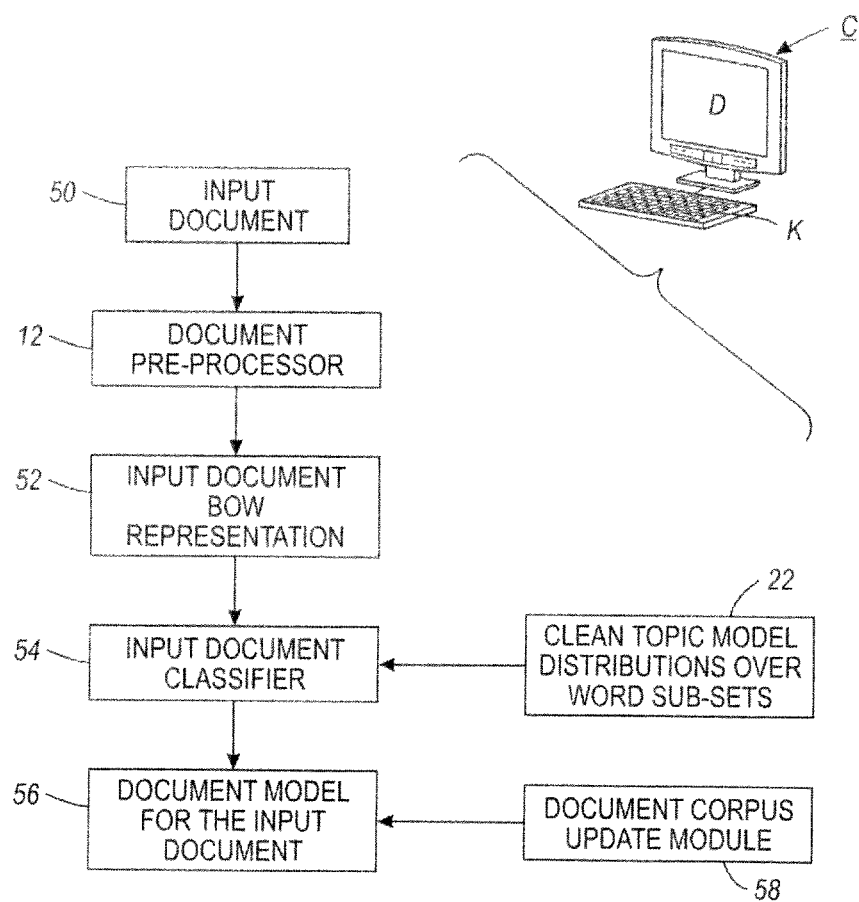
FIG. 3 diagrammatically shows a system for classifying an input document using a topic model generated by the inference system of FIG. 1.
Figure 4:
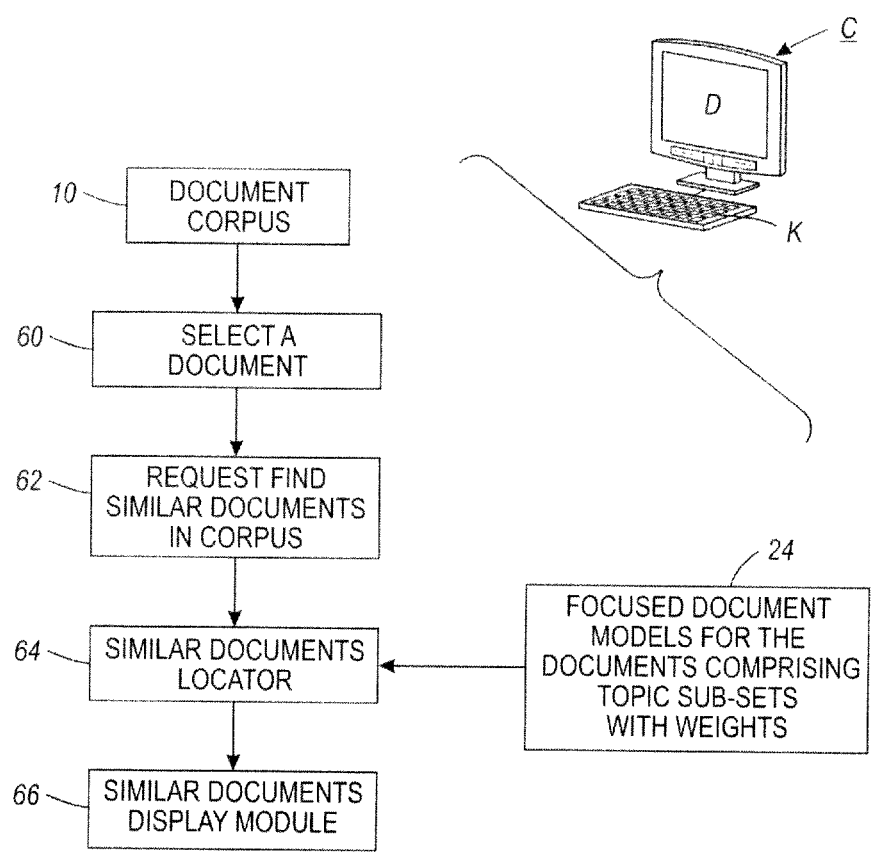
FIG. 4 diagrammatically shows a document retrieval system employing a set of topics generated by the inference system of FIG. 1.

The resulting model can be variously utilized. FIGS. 3 and 4 illustrate two suitable utilizations.

With reference to FIG. 3, an input document 50 is to be classified. The input document 50 is processed by the document pre-processor 12 to generate a corresponding bag-of-words (BOW) representation 52. The document pre-processor 12 of FIG. 3 is suitably operatively identical with, or even the same module as, the document pre-processor 12 of FIG. 1. A document classifier 54 classifies the input document 50 based on comparison of the BOW representation 52 of the input document 50 with the clean topic model distributions 22 which are each over a sub-set of the set of vocabulary words. The use of a clean topic model facilities more accurate and efficient quantitative comparisons between the BOW representation 52 and the clean topic distributions of the clean topic model 22, leading to more accurate and efficient classification. The output of the document classifier 54 is a document model 56 for the input document 10 which associates various topics with the input document 10 with various weights. The document model 56 is optionally used by a document corpus update module 58 to update the corpus 10 with the input document 10. The classification application of FIG. 3 is suitably implemented on the computer C or another digital processor or digital processing device.

With reference to FIG. 4, a document retrieval application is described. The document retrieval application of FIG. 4 is suitably implemented on the computer C or another digital processor or digital processing device. Using the user input device K, a user selects a document from the corpus 10 in an operation 60, and issues a request 62 to find one or more similar documents in the corpus 10. A similar documents locator 64 utilizes the focused document model 24 to identify at least one similar document, and a display module 66 displays the identified at least one similar document (e.g., by displaying the document, or displaying a title of the document, or so forth). The focused document model reduces the number of topics under consideration during the comparison performed by the similar documents locator 64 and also enhances the likelihood that any infrequently occurring topic that has a high weight for the specific selected document is given substantial weight in locating similar documents in the corpus 10.

Again, the applications of FIGS. 3 and 4 are merely illustrative examples, and other applications are also contemplated.

The disclosed inference system of FIG. 1 has been constructed and tested for a test corpus of documents denoted herein as test corpus w*. The perplexity is used as a performance measure. The perplexity is defined as:

$$\ln P(w^* \mid w) \approx \sum_d \sum_v n^*_{vd} \ln \frac{1}{P} \sum_p \sum_k \mathbb{E}\left[\phi^{(p)}_{vk} \mid w, z^{(p)}\right] \mathbb{E}\left[\theta^{(p)}_{kd} \mid z^{(p)}\right]. \quad (18)$$

Perplexity is a standard measure of quality, and is closely related to the held-out likelihood. The lower the perplexity, the better. The posterior expectations are approximated as follows:

$$\mathbb{E}[\theta_{kd} \mid z] \approx \frac{\mathbb{E}\left[\bar{\theta}_{kd} \mid z, \Theta^{\backslash kd}\right] \alpha + n_{\cdot kd}}{\sum_k \mathbb{E}\left[\bar{\theta}_{kd} \mid z, \Theta^{\backslash kd}\right] \alpha + n_{\cdot \cdot d}} \quad (19)$$

and $$\mathbb{E}[\phi_{vk} \mid w, z] \approx \frac{\mathbb{E}\left[\bar{\phi}_{vk} \mid w, z, \Phi^{\backslash vk}\right] \beta + n_{vk \cdot}}{\sum_v \mathbb{E}\left[\bar{\phi}_{vk} \mid w, z, \Phi^{\backslash vk}\right] \beta + n_{\cdot k \cdot}}. \quad (20)$$

During the test, $\bar{\Phi}$, $\Phi$ are $\kappa$ fixed to the estimates of the training set. Perplexity is computed on half of the words on the test documents, the other half being used to estimate the topic proportions and the sparsity pattern of $\bar{\Theta}$.

Figure 5:
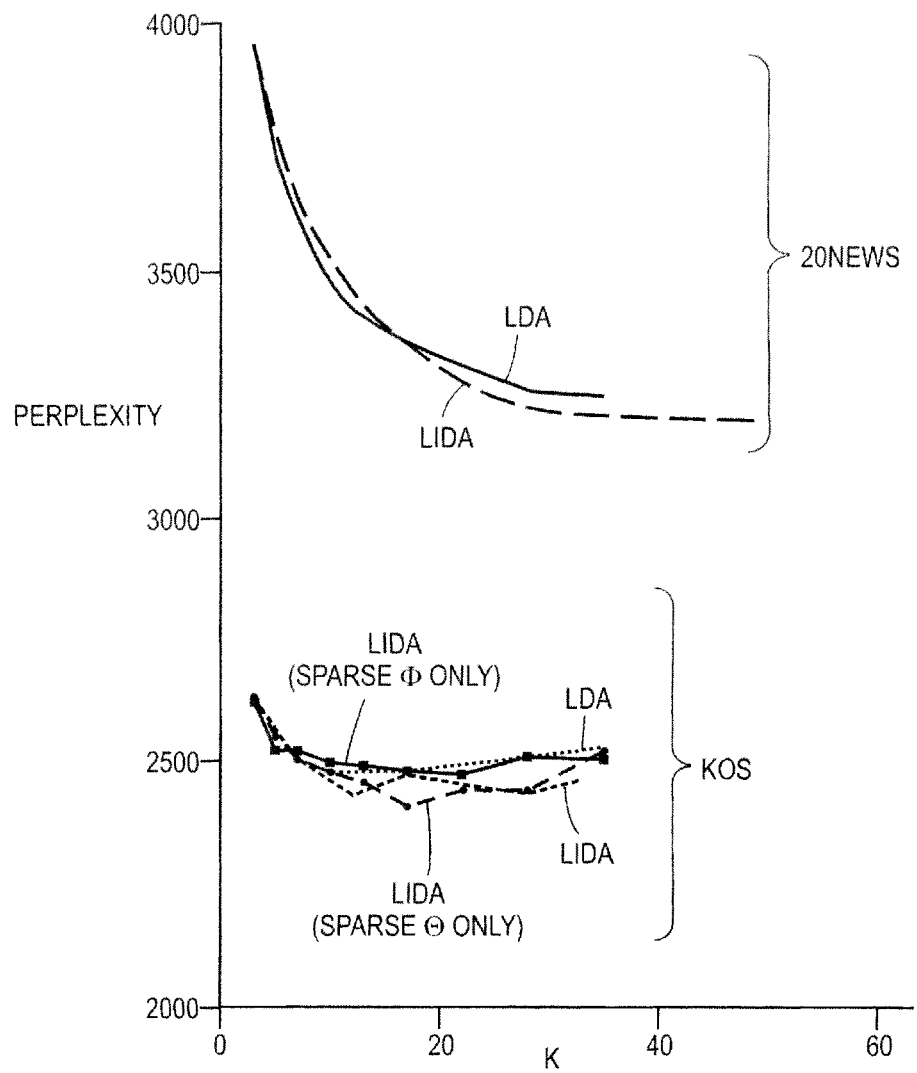
FIG. 5 diagrammatically shows document modeling results for LDA with a conventional Dirichlet prior probability distribution and for LIDA (that is, LDA with an IBP compound Dirichlet prior probability distribution).

With reference to FIG. 5, the perplexity results are shown for KOS (from dailykos.com) and for twenty newsgroups data sets (denoted "20NEWS" herein; from http://people.csail.mit.edu/jrennie/20Newsgroups/). For the KOS dataset 1500 documents were used for training and the remaining documents for test. The 20NEWS data set is a collection of approximately 20000 newsgroup documents, partitioned nearly evenly across 20 different newsgroups. For the training 18000 documents were used, and the remaining documents for test.

FIG. 5 shows curves for LDA employing a conventional Dirichlet prior and LIDA (dashed black lines). In all cases LIDA improves the perplexity and a larger number of topics can be used without overfitting. For the KOS dataset results are also shown for LIDA using only focused document topics (but not clean topics) and the clean topic model (without focused topics).

Topic models are dimensionality reduction techniques having a clustering effect. In general, the sparsity-enforcing priors disclosed herein improve the quality of the clustering by reducing the amount of noisy topics. Disclosed herein are probabilistic topic modeling embodiments using IBP compound Dirichlet priors and having a closed form formulation of the degenerate Dirichlet distribution. Collapsed Gibbs sampling algorithms based on these reformulations are also disclosed.

Embodiments of the generative model for sparse topic modeling disclosed herein can be described as follows. For each document, choose a subset of active topics. This is achieved by drawing the set of topics from a truncated IBP. Given this set of topics, draw the topic proportions for that document according to a degenerate Dirichlet distribution, that is, a Dirichlet distribution defined on the simplex of dimension $K_d-1$, where $K_d$ is the number of active topics for document d. Each word in the document is then drawn from one of the selected topics, which are defined as discrete distributions over a subset of words previously associated to this topic. Again, the active words are drawn from a truncated IBP and the word probabilities from a degenerate Dirichlet distribution, that is, a Dirichlet distribution defined on the simplex of dimension $V_d-1$, where $V_d$ is the number of active words for the selected topic.

Equations (9)-(11) herein set forth a collapsed Gibbs sampling algorithm for learning sparse topic models assuming a generative process. Equations (12) and (13) set forth the special cases of a clean topic model and a focused topic model, respectively. As per Equation (11), it is also possible to combine these sparsity aspects. The parameters $\alpha$ and $\beta$ and eta 32 and gamma 34 can be estimated from the data using Equations (14)-(17). The latter two parameters 32, 34 enable tuning or turning off the topic sparsity and document model sparsity, respectively.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a processor to perform a method comprising:
   generating feature representations comprising distributions over a set of features corresponding to objects of a training corpus of objects; and
   inferring a topic model defining a set of topics by performing latent Dirichlet allocation (LDA) with an Indian Buffet Process (IBP) compound Dirichlet prior probability distribution, the inferring being performed using a collapsed Gibbs sampling algorithm by iteratively sampling (1) topic allocation variables of the LDA and (2) binary activation variables of the IBP compound Dirichlet prior probability distribution;
   wherein the inferring performed using a collapsed Gibbs sampling algorithm does not iteratively sample any parameters other than topic allocation variables of the LDA and binary activation variables of the IBP compound Dirichlet prior probability distribution.

2. The non-transitory storage medium as set forth in claim 1, wherein the objects comprise documents including text, the feature representations comprise bag-of-words representations, and the set of features comprises a set of vocabulary words.

3. The non-transitory storage medium as set forth in claim 2, wherein the performing LDA comprises:
   performing LDA with an IBP compound Dirichlet prior probability distribution configured such that the inferred topic model associates a focused sub-set of the set of topics to each document of the training corpus.

4. The non-transitory storage medium as set forth in claim 3, wherein the method further comprises:
   selecting a document of the training corpus of documents; and
   identifying at least one other document of the training corpus of documents that is similar to the selected document based on the focused sub-sets of the set of topics associated to the documents of the training corpus by the inferred topic model.

5. The non-transitory storage medium as set forth in claim 4, wherein the method further comprises:
generating a human-viewable representation of the identified at least one other document.

6. The non-transitory storage medium as set forth in claim 2, wherein the performing LDA comprises:
performing LDA with an IBP compound Dirichlet prior probability distribution configured such that the inferred topic model is a clean topic model in which each topic is defined as a distribution over a sub-set of the set of vocabulary words selected by the IBP compound Dirichlet prior probability distribution.

7. The non-transitory storage medium as set forth in claim 6, wherein the method further comprises:
generating an input bag-of-words representation comprising a distribution over the set of vocabulary words for an input document which is not part of the training corpus; and
classifying the input document respective to the topics of the set of topics using the clean topic model.

8. The non-transitory storage medium as set forth in claim 1, wherein the performing LDA comprises:
performing LDA with an IBP compound Dirichlet prior probability distribution configured such that the inferred topic model associates a focused sub-set of the set of topics to each object of the training corpus.

9. The non-transitory storage medium as set forth in claim 8, wherein the method further comprises:
selecting an object of the training corpus of objects; and
identifying at least one other object of the training corpus of object that is similar to the selected object based on the focused sub-sets of the set of topics associated to the objects of the training corpus by the inferred topic model.

10. The non-transitory storage medium as set forth in claim 1, wherein the performing LDA comprises:
performing LDA with an IBP compound Dirichlet prior probability distribution configured such that the inferred topic model is a clean topic model in which each topic is defined as a distribution over a sub-set of the set of features selected by the IBP compound Dirichlet prior probability distribution.

11. The non-transitory storage medium as set forth in claim 10, wherein the method further comprises:
generating an input feature representation comprising a distribution over the set of features for an input object which is not part of the training corpus; and
classifying the input object respective to the topics of the set of topics using the clean topic model.

12. The non-transitory storage medium as set forth in claim 1, wherein the performing LDA comprises:
performing LDA with an IBP compound Dirichlet prior probability distribution configured such that (i) the inferred topic model associates a focused sub-set of the set of topics to each object of the training corpus and (ii) the inferred topic model is a clean topic model defining each topic as a distribution over a sub-set of the set of features selected by the IBP compound Dirichlet prior probability distribution.

13. A method comprising:
generating feature representations comprising distributions over a set of features corresponding to objects $d=1, \ldots, D$ of a training corpus of D objects; and
inferring a generative topic model defining a set of topics $k=1, \ldots, K$ by performing a latent generative topic model allocation using a collapsed Gibbs sampling algorithm with an Indian Buffet Process (IBP) compound prior probability distribution having binary activation variables $\overline{\theta} \in \mathbb{N}^{K \times D}$ and object-specific topic proportions $\theta_d | \overline{\theta}_d \sim \text{Dirichlet}(\alpha \overline{\theta}_d)$ with weights $\alpha$ that are the same for all the objects $d=1, \ldots, D$,
wherein the inferring includes iterative sampling of (1) topic allocation variables of the generative topic model allocation and (2) the binary activation variables $\overline{\theta}$ of the IBP compound prior probability distribution; and
wherein the generating and inferring are performed by a digital processor.

14. The method as set forth in claim 13, wherein the objects $d=1, \ldots, D$ comprise documents including text, the feature representations comprise bag-of-words representations, and the set of features comprises a set of vocabulary words.

15. The method as set forth in claim 13, wherein the inferring comprises:
inferring the generative topic model by performing the latent generative topic model allocation using a collapsed Gibbs sampling algorithm with an IBP prior probability distribution configured such that the inferred generative topic model associates a focused sub-set of the set of topics to each object of the training corpus.

16. The method as set forth in claim 15, further comprising:
selecting an object of the training corpus of objects; and
identifying at least one other object of the training corpus of object that is similar to the selected object based on the focused sub-sets of the set of topics associated to the objects of the training corpus by the inferred topic model.

17. The method as set forth in claim 13, wherein the inferring comprises:
inferring the generative topic model by performing the latent generative topic model allocation using a collapsed Gibbs sampling algorithm with an IBP prior probability distribution configured such that the inferred topic model is a clean topic model in which each topic is represented by a distribution over a sub-set of the set of features selected by the IBP prior probability distribution.

18. The method as set forth in claim 17, further comprising:
generating an input feature representation comprising a distribution over the set of features for an input object which is not part of the training corpus; and
classifying the input object respective to the topics of the set of topics using the clean topic model.

19. The method as set forth in claim 13, wherein the latent generative topic model allocation comprises a latent Dirichlet allocation (LDA), the IBP compound prior probability distribution comprises an IBP compound Dirichlet prior probability distribution, and the inferring includes iterative sampling of (1) topic allocation variables of the LDA and (2) the binary activation variables $\overline{\theta}$ of the IBP compound Dirichlet prior probability distribution.

20. The method as set forth in claim 13, wherein the latent generative topic model allocation is selected from the group consisting of (i) a latent Dirichlet allocation (LDA) and (ii) a probabilistic latent semantic analysis (PLSA) allocation.

21. An apparatus comprising:
a digital processor configured to perform a method including:

generating feature representations comprising distributions over a set of features corresponding to documents d=1, ..., D of a training corpus of D documents; and inferring a generative latent Dirichlet allocation (LDA) or probabilistic latent semantic analysis (PLSA) topic model defining a set of topics k=1, ..., K by performing a latent generative topic model allocation using a collapsed Gibbs sampling algorithm with an Indian Buffet Process (IBP) compound prior probability distribution having binary activation variables $\bar{\theta} \in \mathbb{N}^{K \times D}$ and document-specific topic proportions $\theta_d | \bar{\theta}_d \sim \text{Dirichlet}(\alpha \bar{\theta}_d)$ with weights $\alpha$ that are the same for all the documents d=1, ..., D;

wherein the inferring includes iterative sampling of (1) topic allocation variables of the generative topic model allocation and (2) the binary activation variables $\bar{\theta}$ of the IBP compound prior probability distribution.

\* \* \* \* \*